United States Patent
Christensen (10) Patent No.: US 6,814,191 B2
(45) Date of Patent: Nov. 9, 2004

(54) THRUST REVERSER SYSTEM WITH A PASS-THROUGH TORQUE ACTIVATED BRAKE

(75) Inventor: Donald J. Christensen, Phoenix, AZ (US)

(73) Assignee: Honeywell International, Inc., Morristown, NJ (US)

(*) Notice: Subject to any disclaimer, the term of this patent is extended or adjusted under 35 U.S.C. 154(b) by 0 days.

(21) Appl. No.: 10/623,324

(22) Filed: Jul. 18, 2003

(65) Prior Publication Data

US 2004/0035653 A1 Feb. 26, 2004

Related U.S. Application Data

(62) Division of application No. 10/212,384, filed on Aug. 5, 2002, now Pat. No. 6,666,307.

(51) Int. Cl.[7] .................................................. B60T 7/12
(52) U.S. Cl. ................ 188/134; 188/73.39; 188/73.46; 188/181 T
(58) Field of Search ............... 188/72.8, 72.7, 188/29, 73.39, 73.46, 181 T, 181 R, 181 A, 181 C, 134; 60/226.2; 192/54.52, 93 A, 55.2; 267/273, 284

(56) References Cited

U.S. PATENT DOCUMENTS

| | | |
|---|---|---|
| 22,852 A | 3/1859 | Swift, Jr. |
| 2,015,688 A | 10/1935 | Ney |
| 2,441,052 A | 5/1948 | Wilmer |
| 2,660,281 A | 11/1953 | Ochtman |
| 2,819,589 A | 1/1958 | Geyer |
| 3,367,456 A | 2/1968 | Bohnhoff |
| 3,596,740 A | 8/1971 | Nau |
| 3,653,226 A | 4/1972 | Westbury |
| 3,831,400 A | 8/1974 | Morin |
| 3,900,084 A | * 8/1975 | Farr ........................ 188/196 F |
| 4,030,578 A | 6/1977 | Cacciola et al. |
| 4,346,793 A | 8/1982 | Fuse et al. |
| 4,442,928 A | 4/1984 | Eastman |
| 4,458,582 A | 7/1984 | Linton |
| 4,459,121 A | 7/1984 | Gazzera et al. |
| 4,531,617 A | 7/1985 | Martin et al. |
| 4,543,783 A | 10/1985 | Greiine et al. |
| 4,545,470 A | 10/1985 | Grimm |
| 4,579,039 A | 4/1986 | Ebbing |
| 4,693,349 A | 9/1987 | Tysver |
| 4,815,570 A | * 3/1989 | Tsuchida et al. ......... 188/181 A |
| 4,850,458 A | * 7/1989 | Allan et al. ................. 188/134 |
| 4,860,865 A | * 8/1989 | Montalvo et al. ............. 192/70 |
| 4,898,265 A | 2/1990 | Metcalf |
| 5,090,529 A | * 2/1992 | Fahy et al. ............... 192/223.3 |
| 5,280,704 A | 1/1994 | Anderson et al. |
| 5,359,848 A | 11/1994 | Davies |
| 5,545,109 A | 8/1996 | Hayakawa |
| 5,609,020 A | 3/1997 | Jackson et al. |
| 5,769,362 A | 6/1998 | Greene et al. |
| 5,944,148 A | 8/1999 | Bae et al. |
| 6,209,690 B1 | 4/2001 | Kuivamaki et al. |
| 6,464,061 B1 | * 10/2002 | Inoue et al. ............. 192/223.3 |
| 2003/0051950 A1 | * 3/2003 | Harvey ........................ 188/134 |
| 2003/0085090 A1 | * 5/2003 | Kasuya et al. ................. 192/35 |

FOREIGN PATENT DOCUMENTS

| | | | |
|---|---|---|---|
| JP | 5948252 | * | 3/1984 |
| JP | 200411764 | * | 1/2004 |

* cited by examiner

*Primary Examiner*—Robert A. Siconolfi
*Assistant Examiner*—Devon Kramer
(74) *Attorney, Agent, or Firm*—Douglas A. Mullen, Esq.

(57) ABSTRACT

A thrust reverser system that includes a pass-through torque activated brake assembly that limits the torque applied in portions of the thrust reverser system drive train. The brake assembly includes two plates that are coupled together with a torsion spring. When a predetermined torque is applied to the torsion spring, the torsion spring displaces the plates from one another. Balls that are positioned in cammed grooves in each of the plates causes the plates to translate away from one another and contact brake surfaces to thereby limit the torque in the drive train.

10 Claims, 8 Drawing Sheets

THRUST REVERSER SYSTEM WITH A PASS-THROUGH TORQUE ACTIVATED BRAKE

CROSS-REFERENCE TO RELATED APPLICATIONS

This application is a divisional application of U.S. patent application Ser. No. 10/212,384, filed Aug. 5, 2002 now U.S. Pat. No. 6,666,307.

FIELD OF THE INVENTION

The present invention relates to aircraft engine thrust reverser systems and, more particularly, to a device used to limit the torque in an aircraft thrust reverser drive train.

BACKGROUND OF THE INVENTION

When a jet-powered aircraft lands, the landing gear brakes and imposed aerodynamic drag loads (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally forward direction to decelerate the aircraft. Because the jet thrust is directed generally forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position.

The moveable thrust reverser components in each of the above-described designs are moved between the stowed and deployed positions by actuators. Power to drive the actuators may come from one or more drive motors, or from a hydraulic or pneumatic fluid system connected to the actuators, depending on the system design. A drive train that includes one or more synchronization mechanisms, such as flexible rotating shafts, may interconnect the actuators (and drive motors, if included) to maintain synchronous movement of the moveable thrust reverser components.

Each of the above-described system configurations is robustly designed and is safe and reliable. Nonetheless, analysis has shown that secondary damage to various portions of the thrust reverser system may result under certain postulated conditions. For example, if one of the actuators becomes jammed, it is postulated that all of the driving force from the remaining operable actuators would be concentrated, via the synchronization mechanisms, on the jammed actuator. This postulated condition may result in damage to the actuator system components, including the motors (if included), actuators, synchronization mechanisms, or the moveable thrust reversers components.

One solution to above-described postulated condition is to include one or more torque limiters in the drive train that applies a brake when a predetermined torque magnitude in the drive train is attained. One such toque limiters is commonly implemented by attaching two plates between two shaft ends, and spring loading the plates together. Each plate may include a series of pockets that have ramped sides. A torque transmitting ball may be inserted into each of the pockets. These balls transmit torque between the two plates and are therefore under a shear force. If the torque is high enough to overcome the spring force, the balls roll along the ramped sides of the pockets causing the plates to spread apart and engage brake pads.

Although the torque limiters presently used in thrust reverser actuation systems are believed to be safe and reliable, each may exhibit certain drawbacks in particular situations. For example, some torque limiters have sliding surfaces that add friction losses, which may adversely affect the repeatability of the activation torque. Some torque limiters also transmit all of the operational torque through the torque transmitting balls, which can concentrate stress in the balls and thus adversely affect component size and weight. Additionally, some torque limiters are not suited for relatively high-speed applications, and still others are relatively complex and costly.

Hence, there is a need for torque limiter that addresses one or more of the drawbacks noted above. Namely, a torque limiter that does not have significant friction losses, which allows accurate, repeatable torque limiting, and/or a torque limiter that does not transmit all of the operational torque through the balls, and/or is compact and is relatively low is weight, and/or is relatively inexpensive and simple in design. The present invention addresses one or more of these needs.

SUMMARY OF THE INVENTION

The present invention provides a torque activated brake assembly, and a thrust reverser system that incorporates the brake assembly. The brake assembly has relatively low friction losses, which allows accurate and repeatable torque limiting operations. The brake assembly is also compact, constructed of a relatively small number of parts and, therefore, has a low rotating inertia. The brake assembly is additionally constructed so that the operational torque is not transmitted through the balls.

In one embodiment of the present invention, and by way of example only, a torque activated brake assembly includes a first plate, at least two grooves in the first plate, a second plate, at least two grooves in the second plate, at least two balls, and a torsion spring. The first plate has an interior side, an exterior side, and an opening extending therebetween. The grooves in the first plate are formed in the first plate interior side, and each have a cam surface located at a predetermined angle. The second plate has an interior side, an exterior side, and an opening extending therebetween, and the second plate interior side is positioned opposed to the first plate interior side. The grooves in the second plate are formed in the second plate interior side and are substantially aligned with at least two of the grooves in the first plate. The second grooves each have a cam surface located at a predetermined angle. The balls are positioned one each in the aligned grooves in the first and second plates. The torsion spring has a first end coupled within the first plate opening and a second end coupled within the second plate opening.

In another exemplary embodiment, a torque activated brake assembly includes a first plate, at least two grooves in the first plate, a second plate, at least two grooves in the second plate, at least two balls, a torsion spring, a housing, a first brake surface, and a second brake surface. The first plate has an interior side, an exterior side, and an opening extending therebetween. The grooves in the first plate are formed in the first plate interior side, and each have a cam surface located at a predetermined angle. The second plate has an interior side, an exterior side, and an opening extending therebetween, and the second plate interior side is positioned opposed to the first plate interior side. The grooves in the second plate are formed in the second plate interior side and are substantially aligned with at least two of the grooves in the first plate. The grooves in the second plate are formed in the second plate interior side, and each have a cam surface located at a predetermined angle. The balls are positioned one each in the aligned grooves in the first and second plates. The torsion spring has a first end coupled within the first plate opening and a second end coupled within the second plate opening. The housing surrounds at least a portion of the first and second plates. The first brake surface is mounted in the housing and is positioned a first predetermined distance from the first plate exterior side. The second brake surface is mounted in the housing and is positioned the first predetermined distance from the second plate exterior side. The first plate exterior side and the second plate exterior side contact the first brake surface and the second brake surface, respectively, when the balls are positioned along the groove cam surfaces a second predetermined distance from the first plate interior side and the second plate interior side.

In yet another exemplary embodiment, a control system for moving a thrust reverser includes at least one drive motor, at least two actuators, at least one synchronization mechanism, and a torque activated brake assembly. Each drive motor is operable to supply a driving force. Each actuator is operably coupled to receive the driving force from the motor to thereby move the thrust reverser between a stowed position and a deployed position. Each synchronization mechanism mechanically couples the actuators and is configured to maintain the actuators in substantial synchronization with one another upon receipt, by the actuators, of the driving force. The torque activated brake assembly is operably coupled between at least one drive motor and at least one synchronization mechanism, and is activated upon a predetermined torque value being reached between each operably coupled motor and synchronization mechanism. The brake assembly includes a first plate, at least two grooves in the first plate, a second plate, at least two grooves in the second plate, at least two balls, and a torsion spring. The first plate has an interior side, an exterior side, and an opening extending therebetween. The grooves in the first plate are formed in the first plate interior side, and each have a cam surface located at a predetermined angle. The second plate has an interior side, an exterior side, and an opening extending therebetween, and the second plate interior side is positioned opposed to the first plate interior side. The grooves in the second plate are formed in the second plate interior side and are substantially aligned with at least two of the grooves in the first plate. The second grooves each have a cam surface located at a predetermined angle. The balls are positioned one each in the aligned grooves in the first and second plates. The torsion spring has a first end coupled within the first plate opening and a second end coupled within the second plate opening.

In still a further exemplary embodiment, a control system for moving a thrust reverser includes at least two actuators, at least two synchronization mechanisms, and a torque activated brake assembly. Each actuator is operably coupled to receive a driving force to thereby move the thrust reverser between a stowed position and a deployed position. Each synchronization mechanism mechanically couples the actuators and is configured to maintain the actuators in substantial synchronization with one another upon receipt, by the actuators, of the driving force. The torque activated brake assembly is operably coupled between at least two synchronization mechanisms, and is activated upon a predetermined torque value being reached between the operably coupled synchronization mechanisms. The brake assembly includes a first plate, at least two grooves in the first plate, a second plate, at least two grooves in the second plate, at least two balls, and a torsion spring. The first plate has an interior side, an exterior side, and an opening extending therebetween. The grooves in the first plate are formed in the first plate interior side, and each have a cam surface located at a predetermined angle. The second plate has an interior side, an exterior side, and an opening extending therebetween, and the second plate interior side is positioned opposed to the first plate interior side. The grooves in the second plate are formed in the second plate interior side and are substantially aligned with at least two of the grooves in the first plate. The second grooves each have a cam surface located at a predetermined angle. The balls are positioned one each in the aligned grooves in the first and second plates. The torsion spring has a first end coupled within the first plate opening and a second end coupled within the second plate opening.

In other exemplary embodiments, novel thrust reverser brake plate and torsion springs are also disclosed. The configurations of these components is described above.

Other independent features and advantages of the preferred brake assembly and thrust reverser system will become apparent from the following detailed description, taken in conjunction with the accompanying drawings which illustrate, by way of example, the principles of the invention.

DETAILED DESCRIPTION OF THE PREFERRED EMBODIMENTS

Before proceeding with the detailed description, it is to be appreciated that the present invention is not limited to use in conjunction with a specific thrust reverser system design. Thus, although the present invention is explicitly described as being implemented in a cascade-type thrust reverser system, in which transcowls are used as the moveable thrust reverser component, it should be appreciated that it can be implemented in other thrust reverser system designs, including those described above and those known in the art.

Figure 1:
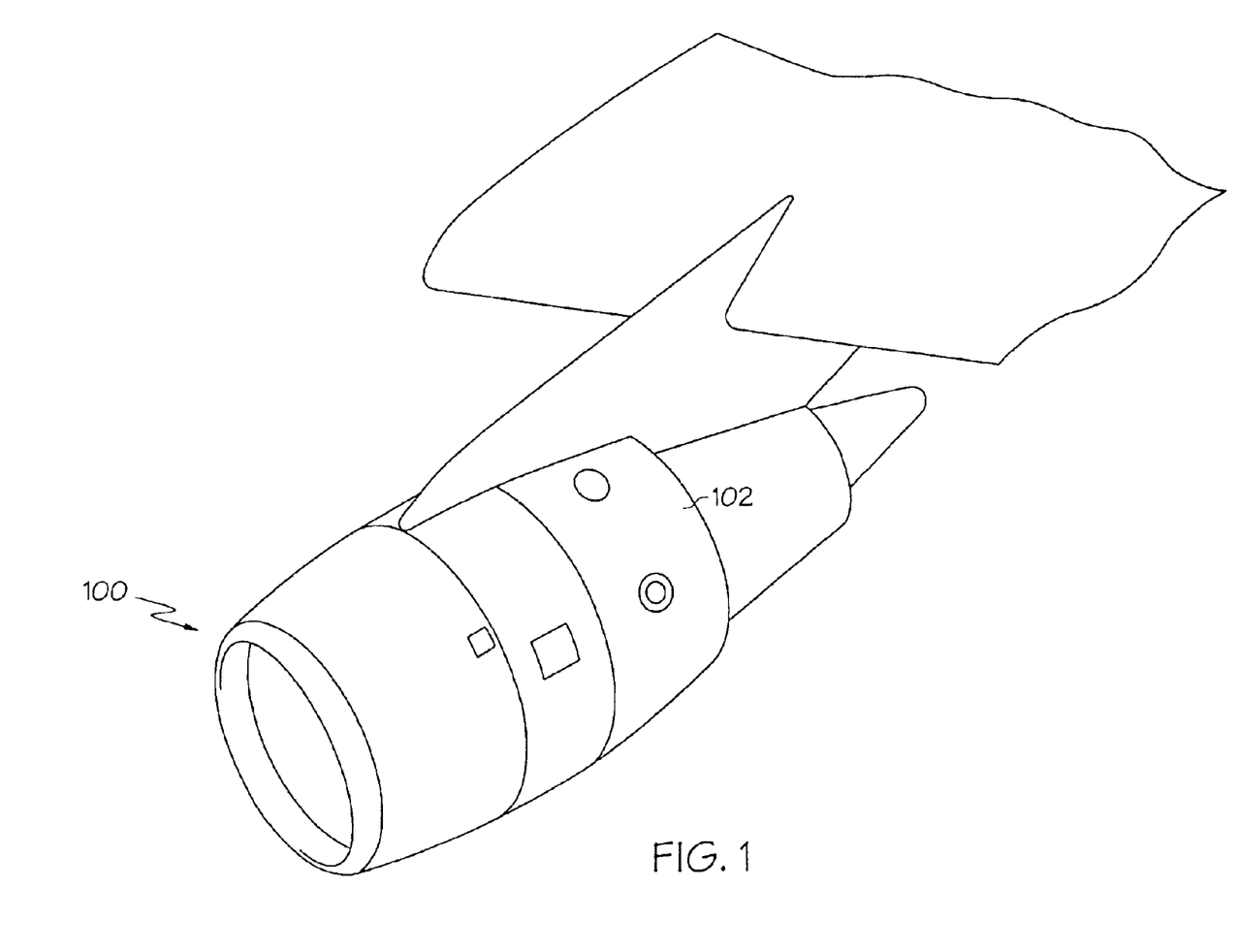
FIG. 1 is a perspective view of an aircraft engine.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 that are positioned circumferentially on the outside of the fan case 100.

Figure 2:
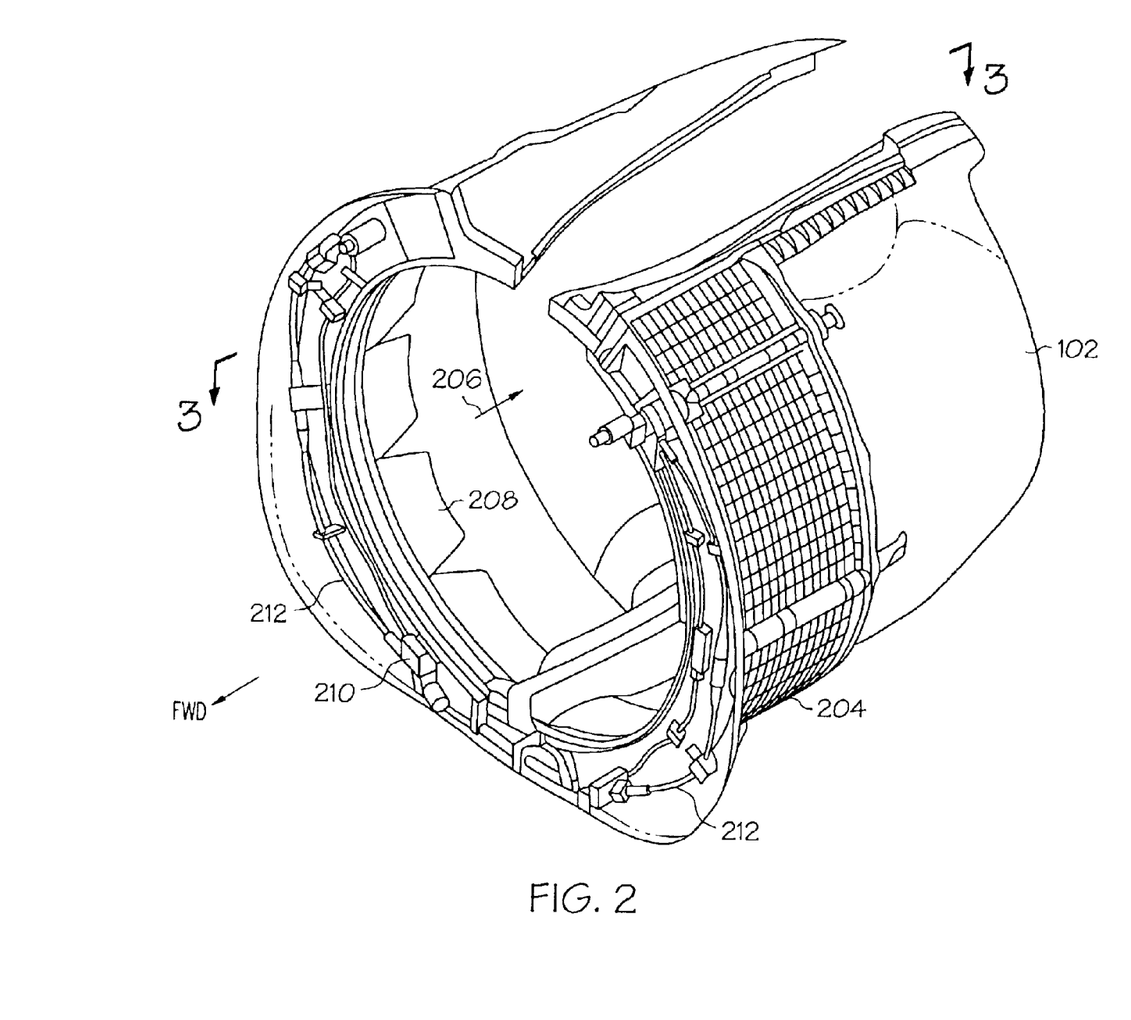
FIG. 2 is a perspective view of portions of an engine fan cowl and thrust reverser system utilized with the engine of FIG. 1.
Figure 3:
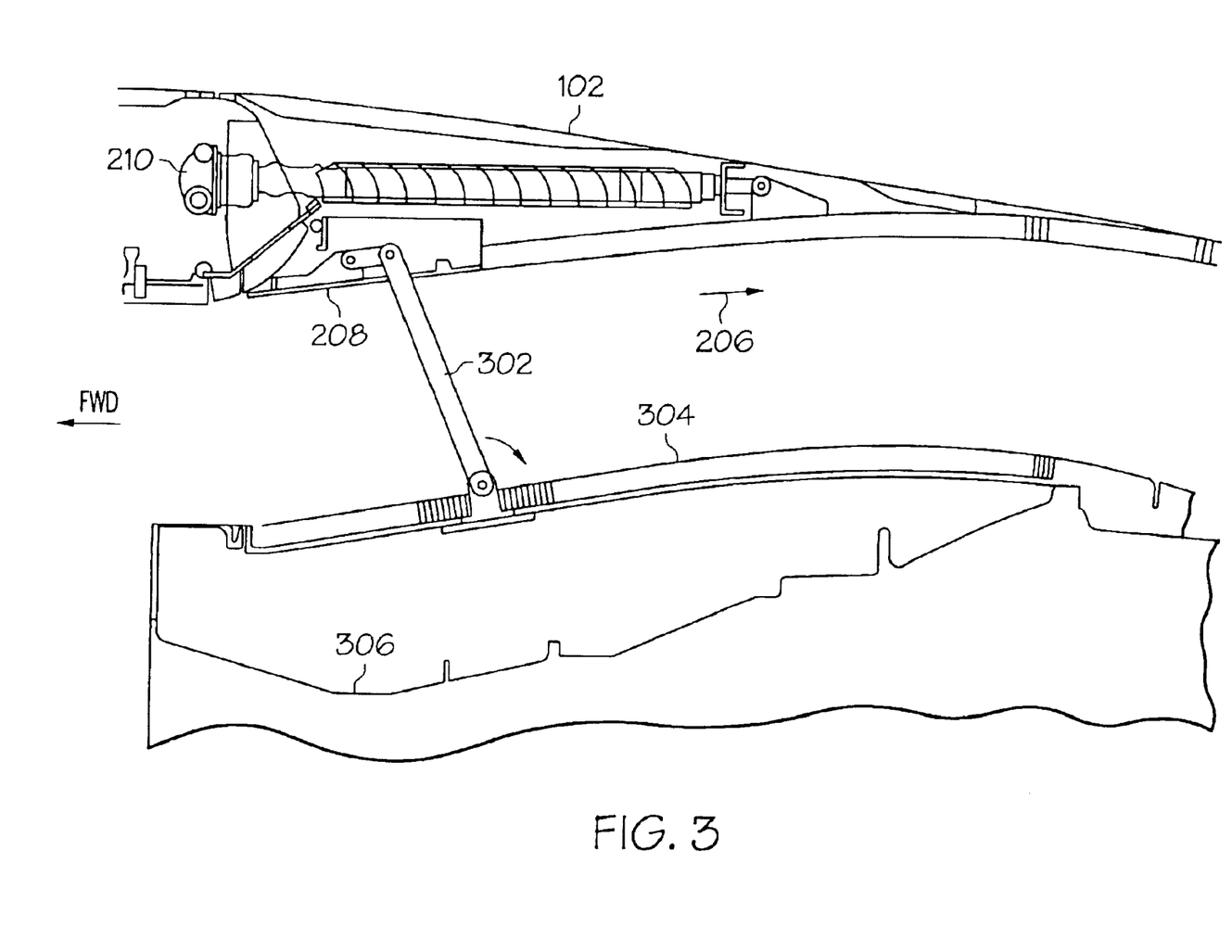
FIG. 3 is a partial cross section view taken along line 3—3 of FIG. 2.
Figure 4:
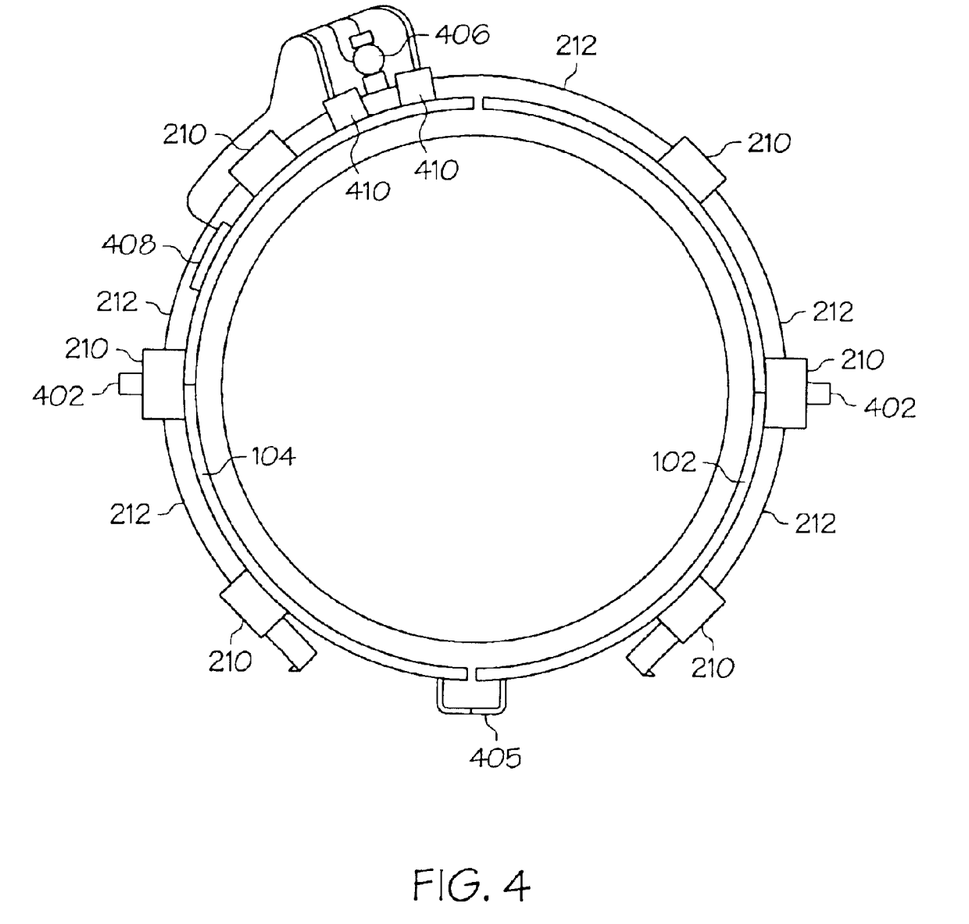
FIG. 4 is a simplified end view of a first embodiment of a thrust reverser actuation system that may incorporate the brake assembly of the present invention.

As shown more particularly in FIGS. 2, 3 and 4, the transcowls 102 cover a plurality of cascade vanes 204, which are positioned between the transcowls 102 and a bypass air flow path 206. A mechanical link 405, such as a pin or latch, may couple the transcowls 102 together to maintain the transcowls 102 in correct alignment on the guides (unillustrated) on which the transcowls 102 translate. A series of blocker doors 208 are mechanically linked to the transcowls 102 via a drag link 302 that is rotatably connected to an outer wall 304 that surrounds the engine case 306. In the stowed position, the blocker doors 208 form a portion of the outer wall 304 and are therefore oriented parallel to a bypass air flow path 206. When the thrust reversers are commanded to deploy, the transcowls 102 are translated aft, causing the blocker doors 208 to rotate into a deployed position, such that the bypass air flow path 206 is blocked. This also causes the cascade vanes 204 to be exposed and the bypass air flow to be redirected out the cascade vanes 204. The re-direction of the bypass air flow in a forward direction creates a reverse thrust and, thus, works to slow the airplane.

A plurality of actuators 210 are individually coupled to the transcowls 102. In a preferred embodiment, half of the actuators 210 are coupled to one of the transcowls 102, and the other half are coupled to another transcowl 104. While not critical to understand or enable the present invention, it is noted that some or all of the actuators 210 may include locks, some or all of which may include position sensors. In addition, the transcowls 102 and 104 also may each include locks. It is noted that the actuators 210 may be any one of numerous actuator designs presently known in the art or hereafter designed. However, in this embodiment the actuators 210 are ballscrew actuators. It is additionally noted that the number and arrangement of actuators 210 is not limited to what is depicted in FIGS. 2 and 4, but could include other numbers of actuators 210 as well. The number and arrangement of actuators is selected to meet the specific design requirements of the system.

The actuators 210 are interconnected via a plurality of drive mechanisms 212, each of which, in the particular depicted embodiment, comprises a flexible shaft. The flexible shafts 212 ensure that the actuators 210, and thus all points of each transcowl 102, as well as both transcowls 102, 104 move in a substantially synchronized manner. For example, when one transcowl 102 is moved, the other transcowl 104 is moved a like distance at substantially the same time. Other drive or synchronization mechanisms that may be used include electrical synchronization or open loop synchronization, or any other mechanism or design that transfers power between the actuators 210.

Figure 5:
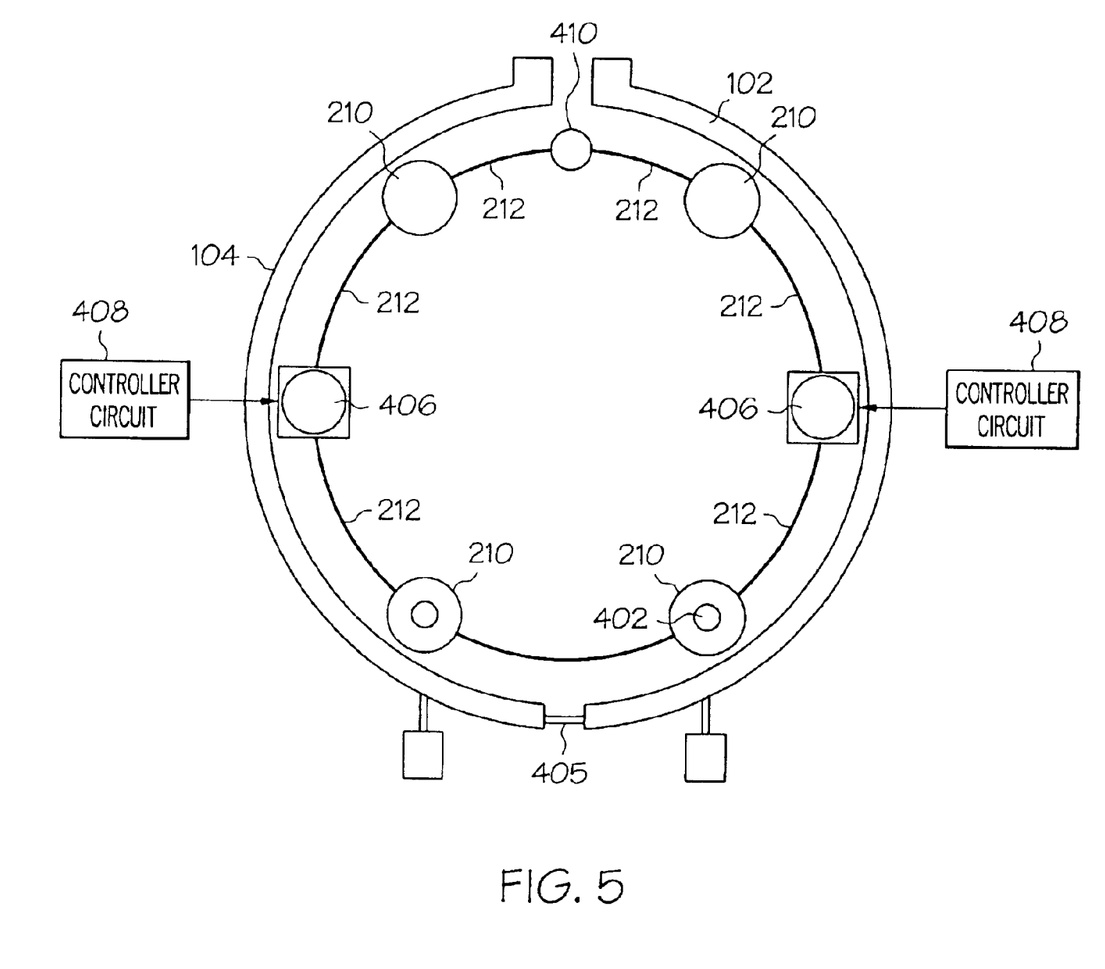
FIG. 5 is a simplified end view of another embodiment of a thrust reverser actuation system that may incorporate the brake assembly of the present invention.

As shown more particularly in FIG. 4, which depicts one particular embodiment, one or more drive units 406, such as a motor, are coupled to the actuators 210 via an associated flexible shaft 212. In the exemplary embodiment depicted in FIG. 4, a single drive unit 406 with dual outputs is used. It will be appreciated, however, that two drive units, one associated with each of the first and second transcowls 102, may also be used. This particular alternate embodiment is illustrated in FIG. 5, and is disclosed in co-pending U.S. application Ser. No. 09/981,011, which is commonly assigned with the present application, and which is hereby incorporated by reference. It will be additionally appreciated that the present invention may encompass more than the number of drive units explicitly depicted in each embodiment, as required to meet the specific design requirements of a particular thrust reverser system.

The drive unit 406 may be either an electric (including any one of the various DC or AC motor designs known in the art), a hydraulic, or a pneumatic motor. Moreover, though not explicitly depicted, the drive unit 406 may include a locking mechanism. In any case, with the depicted arrangement, the rotation of the drive unit 406 results in the synchronous operation of the actuators 210, via the flexible shafts 212, thereby causing the transcowls 102 and 104 to move at substantially the same rate.

A torque activated brake assembly 410 is coupled between each output of the drive unit 406 and one of the flexible shafts 212. In the alternate embodiment depicted in FIG. 5, a single torque activated brake assembly 410 is coupled to the pair of flexible shafts that interconnect the first and second halves of the actuators 210. It will be appreciated that more than one brake assembly per drive unit output could be incorporated into the system.

In the exemplary embodiments depicted in FIGS. 4 and 5, each drive unit 406 is controlled by a control circuit 408. The control circuit 408 receives commands from a non-illustrated engine control system such as, for example, a FADEC (full authority digital engine control) system, and provides appropriate activation signals to the drive unit 406 in response to the received commands. In turn, the drive unit 406 supplies a driving force to the actuators 210 via the torque activated brake assemblies 410 and the flexible shafts 212. As a result, the actuators 210 cause the transcowls 102 to translate between the stowed and deployed positions.

Figure 6:
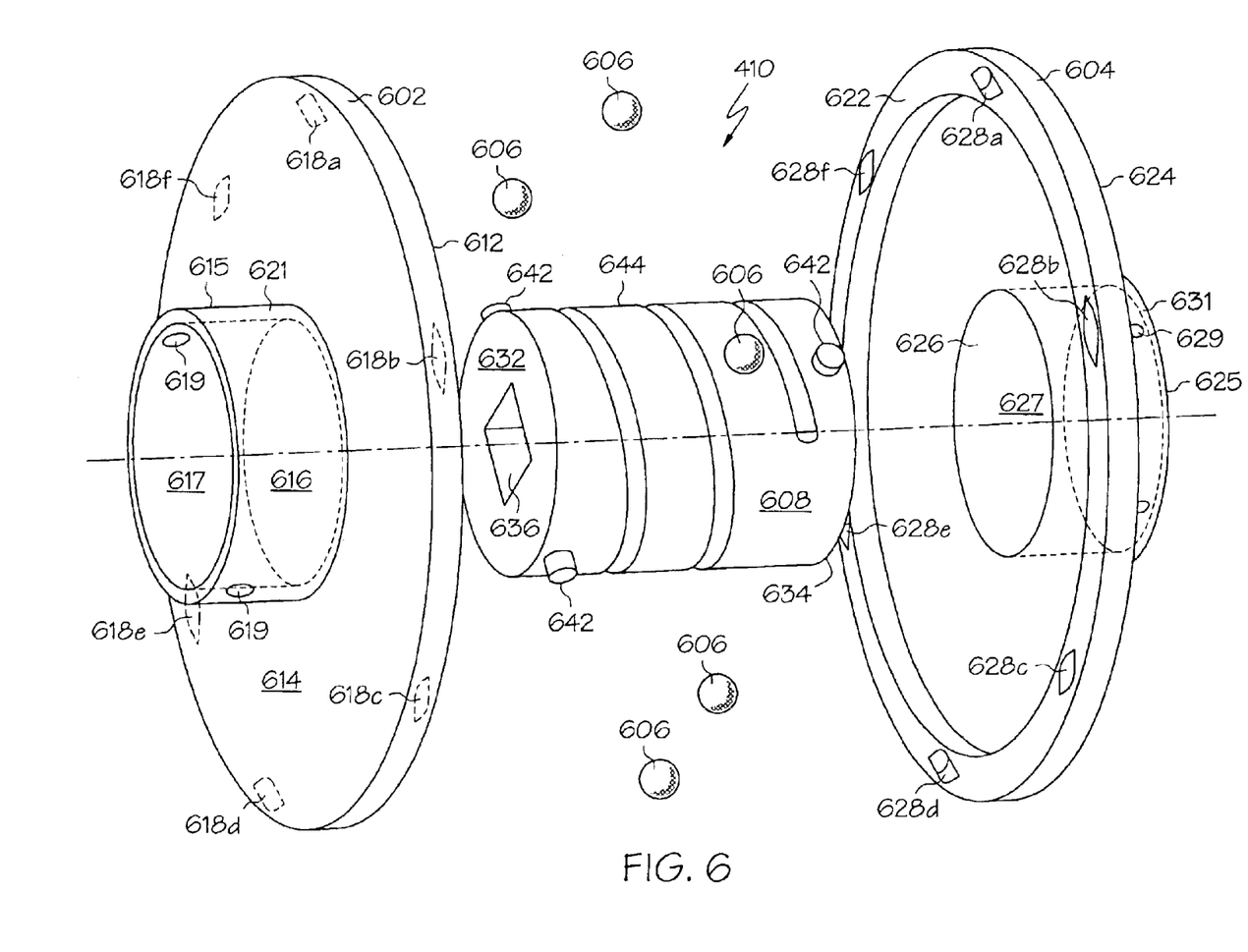
FIG. 6 is an exploded view of a pass-through torque activated brake assembly according to an embodiment of the present invention.
Figure 7:
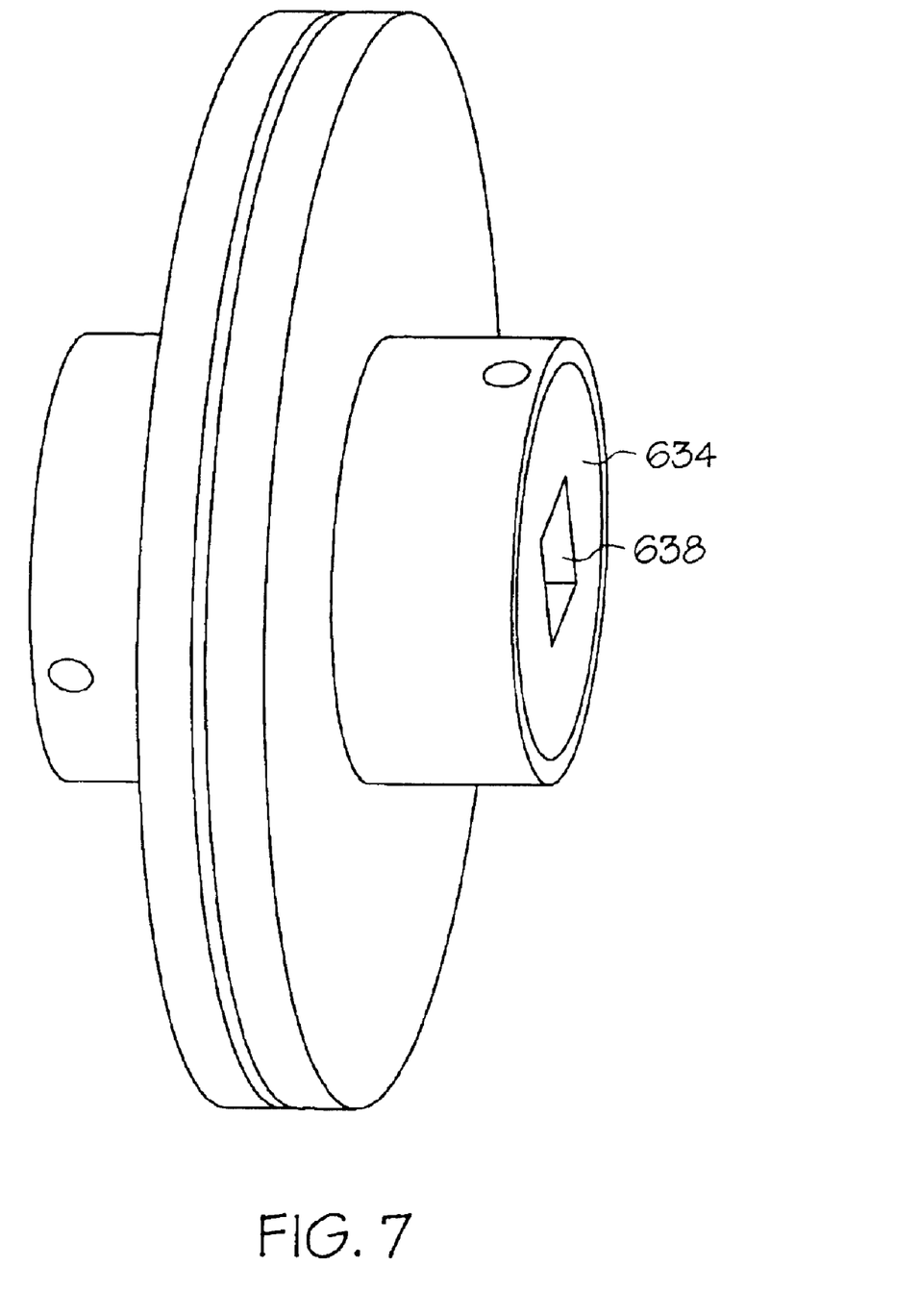
FIG. 7 is a perspective view of the assembly depicted in FIG. 1.
Figure 8:
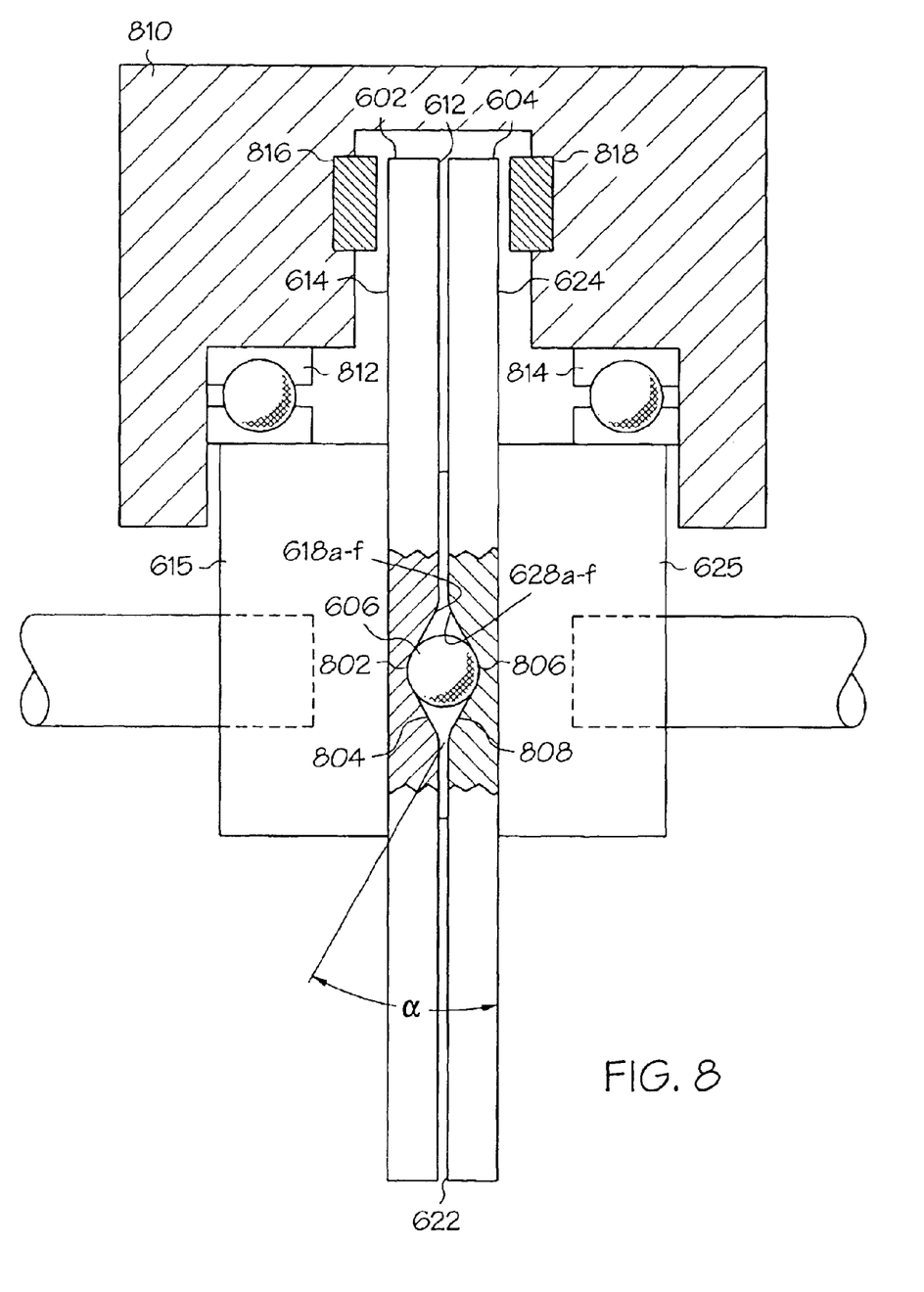
FIG. 8 is a partial cross section view of the assembly depicted in FIGS. 6 and 7, and taken along line 8—8 in FIG. 7, showing the assembly rotationally mounted within a housing.

Turning now to FIGS. 6–8, a detailed description of a preferred embodiment of the torque activated brake assembly 410 will be provided. As these figures depict, the torque activated brake assembly 410 includes a first plate 602, a second plate 604, a plurality of torque sensing balls 606, and a torsion spring 608. The first plate 602 includes interior side 612, an exterior side 614, and an opening 616 (depicted in phantom) extending therebetween. A plurality of first grooves 618a–f (depicted in phantom) are formed on the first plate interior side 612. A first substantially cylindrical wall 615 extends from the first plate exterior side 614 and has an inner surface 617 that surrounds at least a portion of the first plate opening 616. In the depicted embodiment, the first wall 615 includes a plurality of pin receptacles 619 that extend between the first wall inner surface 617 and a first wall outer surface 621. The purpose of these pin receptacles 619 is described more fully below.

The second plate 604 is constructed substantially similar to the first plate 602 and, as such, includes an interior side 622, an exterior side 624, and an opening 626 extending therebetween. A plurality of second grooves 628a–f are formed on the second plate interior side 622, and a second hub 625 extends from the second plate exterior side 624. Similar to the first wall 615, the second wall 625 has an inner surface 627 that surrounds at least a portion of the second plate opening 626, and includes a plurality of pin receptacles 629 that extend between the second wall inner surface 627 and a second wall outer surface 631. The purpose of these pin receptacles 629 is similarly described more fully below.

Each of the first grooves 618a–f, as shown more clearly in FIG. 8, has at least one cam surface 802 located at a first predetermined angle (∀). Similarly, each of the second grooves 628a–f has at least one cam surface 806 located at a second predetermined angle, which may be the same as the first predetermined angle (∀). It will be appreciated that the first and second groove cam surfaces 802 and 806 may each be a single, substantially symmetric surface, or consist of more than one surface.

Although six first grooves 618a–f and six second grooves 628a–f are included in the depicted embodiment, it will be appreciated that this number of grooves is merely exemplary, and that other numbers, both less than or greater than six, may be provided in each plate. Additionally, while the first 602 and second 604 plates are depicted as having the same number of grooves, it will be appreciated that this is also not necessary, and that each plate may have differing numbers of grooves. Preferably, however, the first plate 602 has at least two grooves that are substantially aligned with two grooves on the second plate 604. In any case, it is within the substantially aligned first 618a–f and second 628a–f grooves that one each of the torque sensing balls 606 is positioned.

The torsion spring 608 has a first end 632 and a second end 634. The first end 632 includes an opening 636 dimensioned to receive a source of torque, such as one of the outputs of the drive unit 406 (see FIG. 4) or a flexible shaft 212 (see FIG. 5). The second end 634 includes an opening 638 (see FIG. 7) that may be substantially identical to the first opening 636. The second opening 638 may be coupled to a torque receptor, such as one of the flexible shafts 212 (see FIG. 4). Alternatively, the second opening 638 may be coupled to another source of torque, such as another one of the flexible shafts 212 (see FIG. 5). In the depicted embodiment, a plurality of pins 642 are provided on an outer surface 644 of the torsion spring 608 proximate the torsion spring first 632 and second 634 ends. The pins 642 are received, one each, into one of the pin receptacles 619, 629 to couple the torsion spring first 632 and second 634 ends to the first 602 and second 604 plates, respectively. It will be appreciated that the present invention is not limited to this type of coupling configuration, but could include others such as, for example, a threaded screw and nut configuration.

The torque activated brake assembly 410, in the embodiment depicted in FIG. 8, is rotationally mounted within a housing 810. In particular, the first 615 and second 625 walls are rotationally mounted on first 812 and second 814 bearing assemblies, respectively. The housing 810 includes at least two brake surfaces, a first brake surface 816 and a second brake surface 818. The first brake surface 816 is positioned a predetermined distance from the first plate exterior side 614, and the second brake surface 818 is positioned substantially the same predetermined distance from the second plate exterior side 624.

The torsion spring 608 is machined such that its first 632 and second 634 ends will be rotationally displaced relative to one another upon reaching a first predetermined torque value between the two ends. Once this first torque value is reached and/or exceeded, the torsion spring first 632 and second 634 ends will be rotationally displaced from one another. When this occurs, the torque sensing balls 606 translate within the first 618a–f and second 628a–f grooves, and along the first 804 and second 808 groove side surfaces. As the balls 606 translate, the first 602 and second 604 plates are moved away from each other and toward the first 816 and second 818 brake surfaces, respectively. At a second predetermined torque value the first plate exterior side 614 and second plate exterior side 624 contact the first 816 and second 818 brake surfaces, respectively, thereby limiting the torque transmitted through the brake assembly 410. In addition, the torsion spring 608 is preferably configured to exert a slight tension load upon assembly of the of the torque activated brake assembly 410. This slight tension load aids in keeping the first 602 and second 604 plates in contact with the torque sensing balls 608.

The torque activated brake assembly 410 of the present invention provides several advantages over present torque limiters. First, it has relatively low friction losses, which allows accurate and repeatable torque limiting operations. The brake assembly is also compact, constructed of a small number of parts and, therefore, has a low rotating inertia. The brake assembly is additionally constructed so that the operational torque is not transmitted through the balls, which provides flexibility in selecting ball size, the number of balls, and the radial location of the balls.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A torque activated brake assembly, comprising:
    a first plate having an exterior side, an interior side, and an opening extending therebetween;
    at least two grooves formed in the first plate interior side, the grooves each having a cam surface located at a predetermined angle;
    a second plate having an exterior side, an interior side, and an opening extending therebetween, the second plate interior side positioned opposed to the first plate interior side;
    at least two grooves formed in the second plate interior side and substantially aligned with at least two of the grooves in the first plate, the grooves in the second plate each having a cam surface located at a predetermined angle;

at least two balls, each positioned in the aligned grooves; and a torsion spring having a first end coupled within the first plate opening and a second end coupled within the second plate opening.

2. The assembly of claim 1, wherein:

the first plate has a wall extending from its exterior side, adjacent to the opening in the first plate;

the second plate has a wall extending from its exterior side, adjacent to the opening in the second plate; and the torsion spring first end fits within and is coupled to the wall of the first plate, and the torsion spring second end fits in and is coupled to the wall of the second plate.

3. The assembly of claim 1, further comprising:

a first opening formed in the torsion spring first end; and a second opening formed in the torsion spring second end.

4. The assembly of claim 1, wherein the torsion spring is machined such that the first and second ends are rotationally displaced from one another upon application of a predetermined torque magnitude between the two ends.

5. The assembly of claim 1, further comprising:

a housing surrounding at least a portion of the first and second plates;

a first brake surface positioned a first predetermined distance from the first plate exterior side; and a second brake surface positioned the first predetermined distance from the second plate exterior side, wherein the first and second plate exterior sides contact the first and second brake surfaces, respectively, when the balls are positioned along the first and second cam side surfaces a second predetermined distance from the first and second plate interior sides.

6. A torque activated brake assembly, comprising:

a first plate having an exterior side, an interior side, and an opening extending therebetween;

at least two grooves formed in the first plate interior side, the grooves each having a cam surface located at a predetermined angle;

a second plate having an exterior side, an interior side, and an opening extending therebetween, the second plate interior side positioned opposed to the first plate interior side;

at least two grooves formed in the second plate interior side and substantially aligned with at least two of the grooves in the first plate, the grooves in the second plate each having a cam surface located at a predetermined angle;

at least two balls, each positioned in the aligned grooves;

a torsion spring having a first end coupled within the first plate opening and a second end coupled within the second plate opening;

a housing surrounding at least a portion of the first and second plates;

a first brake surface mounted in the housing and positioned a first predetermined distance from the first plate exterior side; and a second brake surface mounted in the housing and positioned the first predetermined distance from the second plate exterior side, wherein the first plate exterior side and the second plate exterior side contact the first brake surface and the second brake surface, respectively, when the balls are positioned along the groove cam surfaces a second predetermined distance from the first plate interior side and the second plate interior side.

7. The assembly of claim 6, wherein:

the first plate has a wall extending from its exterior side, adjacent to the opening in the first plate;

the second plate has a wall extending from its exterior side, adjacent to the opening in the second plate; and the torsion spring first end fits within and is coupled to the wall of the first plate, and the torsion spring second end fits in and is coupled to the wall of the second plate.

8. The assembly of claim 6, further comprising:

a first opening formed in the torsion spring first end; and a second opening formed in the torsion spring second end.

9. The assembly of claim 6, wherein the torsion spring is machined such that the first and second ends are rotationally displaced from one another upon application of a predetermined torque magnitude between the two ends.

10. The assembly of claim 6, further comprising:

a first bearing assembly mounted within the housing to rotationally mount the first plate therein; and a second bearing assembly mounted within the housing to rotationally mount the second plate therein.

* * * * *